2,979,440

STABILIZED DIASTATIC ENZYME COMPOSITIONS

Carl V. Smythe, Moorestown, N.J., assignor to Rohm & Haas Company, Philadelphia, Pa., a corporation of Delaware No Drawing. Filed Apr. 3, 1957, Ser. No. 650,320

5 Claims. (Cl. 195—64)

This invention relates to stabilized fungal diastatic enzyme compositions. This invention further relates to fungal preparations of improved stability of diastatic activity by having intimately mixed therewith specified amounts of glycerol. The stabilized compositions have various uses and are of particular interest for making tablets.

Baking and related industries currently increase the naturally occurring diastase in wheat and wheat flour by addition of fungal diastase during processing. A high level of fungal diastase is very desirable to promote gas production, and proper starch modification during fermentation. Fungal diastase may be added to baking flours in the form of dry powders or in tablets. Whether they are tablets or powders, it is very important that the enzyme preparations have a highly stabilized diastatic activity. Effective stabilization is particularly important in compressing diastase preparations because it appears that non-glycerol treated preparations readily lose diastatic activity during handling and during tableting.

I have now discovered fungal preparations having improved stability of diastatic activity. I obtain these preparations by intimately mixing a specified amount of glycerol with diastase or diastase preparations. The resulting stabilized compositions are very useful in varied applications. They may be further purified, compounded, and processed in any desired manner. They may be mixed with inert materials. They may be used as such; they may be compressed into tablets. Notwithstanding all these operations, the compositions of my invention evidence remarkable and surprising diastatic stability.

My discovery that glycerol stabilizes diastase in accordance with this invention is quite surprising. Generally, hydrophilic compounds and humectants tend to promote loss of enzyme activity. Glycerol also appears to act quite differently from other polyhydric alcohols such as 1,2-ethylene glycol, propylene glycol, or the lecithins which seem to have no significant stabilizing effect. Moreover, the stabilizing effect of glycerol appears quite specific with respect to the enzymes affected since in mixtures of proteases and diastases the stabilizing effect is much more significant on the latter.

To effect stabilization of diastase any desired diastase preparation may be treated with glycerol in accordance with this invention. Diastase may be in a crude or purified form; it may be mixed with filler or even with ingredients for preparing enzyme tablets. The important point is that the enzyme diastase must be intimately contacted with glycerol.

By diastatic enzyme or diastase there is meant the glycogenic principle which hydrolyzes starch to glucose and also more purified enzyme complexes which principally are $\alpha$-amylases and which hydrolyze starch to glucose, maltose, dextrins, and dextro-maltose. In the instant invention, with diastase there may be present other enzymic complexes, such as esterases, carbohydrases, maltases, peptidases, cellulases, pectinases, and proteases. By proteases there is meant the enzymic complex which hydrolyzes proteins to lower molecular hydrolytic products. Further description of such enzyme complexes may be found in the literature such as "The Enzymes" edited by Sumner and Myrback, Academic Press Inc., N.Y. (1952); and "Dynamic Aspects of Biochemistry," E. Baldwin, Cambridge University Press (1952).

Diastase preparations may be prepared as shown in the art as, for instance, by methods illustrated in "Enzyme Technology" in "The Enzymes," part 2, vol. II; or in "Economic Botany," vol. 5, No. 2 (1951), "Microbiological Production of Enzymes and Their Industrial Applications." Convenient sources for fungal diastase are shown in such art.

In accordance with my invention, preparation of stabilized diastase proceeds in the following manner. A diastase preparation is treated with glycerol. This treatment comprises contacting glycerol with as much as possible of diastase. Such contacting is achieved by mixing glycerol with substantially all of the diastase to be stabilized by any manner and device which is conducive to that end.

The amount of glycerol that may be used for stabilization of diastase varies over a wide range and the optimum depends on the use intended for the stabilized preparation. The important point is that the amount of glycerol in a treated composition should be enough to contact substantially all enzyme particles. In order to achieve this it is preferable to also humect all inert particles which are present with the diastase enzyme during glycerol treatment. The quantity of glycerol that may be used may be related to the weight or the physical characteristics of diastase preparations. The amount of diastase present in a preparation may be expressed in terms of $\alpha$-amylase activity which may be measured by the method of Sandstedt, Kneen and Blish as described in "Cereal Chemistry" 16, 712 (1939) "A Standardized Wohlgemuth Procedure for $\alpha$-Amylase Activity." Diastase activity is expressed in SKB units per gram of material. As little as 0.01% of glycerol per unit weight may have some stabilizing effect. About 30% by unit weight generally is an upper limit of glycerol content. When stabilized diastase is prepared for tabletting, the smallest amount of glycerol that may be used is that amount which tends to decrease loss of diastase activity upon tabletting. About 0.1% per unit weight has some stabilizing effect particularly at lower tabletting pressure.

Regardless of the application intended, the greatest amount of glycerol that may be used to stabilize diastase is that amount which tends to substantially impair free-flowing characteristics of a diastase powder. Since, preferably, enzyme powder should be free-flowing, non-sticky, free of clumps, clots and large aggregation, glycerol should be employed for treatment in an amount below that which would tend to create such physical characteristics. In the case that glycerol has been mixed with diastase in an amount sufficient to impair free-flowing characteristics this condition may be corrected by adding and mixing into the glycerol-treated diastase enough filler and/or enough diastase-free-of-glycerol to restore free-flowing characteristics of the diastase. Preferred amounts of glycerol may vary in the range of 0.5 to 20% of the weight of the preparation to be treated.

The glycerol, 1,2,3-propanetriol, may be any of the usual grades, reagent, U.S.P., or technical; it may be anhydrous or not. When it is not anhydrous, amount of glycerol employed is based on 100% glycerol, adjustment being made for any water present. Preferably, glycerol containing not more than 5% of water by weight is employed.

Diastase preparations to be stabilized in accordance with my invention may be obtained commercially. They are fungal in origin, having been prepared from various fungi, and generally have mixed therewith some kind of inert filler, such as sucrose, dextrose, diatomaceous earth, starch, pectinous materials, wheat middlings, dextrins, gelatin, kaolin, salts, including ammonium or sodium chloride, calcium, acetate, and alkali metal phosphates. Commercial diastase preparations are obtainable, for example, under such trade names as Rhozyme 33, Rhozyme A-4, and Rhozyme S, which are manufactured by Rohm & Haas Company, Philadelphia, Pennsylvania. Similar diastase preparations may be prepared in accordance with methods described in the art, as for instance in United States Patent No. 2,599,532. The resulting diastase may be treated, in accordance with this invention, in a crude form, or diastase may be purified, thereby increasing activity per unit weight, or diastase preparations may be mixed with a filler of the type illustrated above. Enough filler may be added to bring diastase activity to any desired level. Fillers may make up from about 1 to 99%, and preferably from about 50 to 90%, of the total weight of the substantially dry diastase preparation.

In this invention there may be treated diastase preparations having any level of SKB activity units and this treatment may be effectuated at any convenient stage of their preparation. Treatment of diastase preparations with glycerol, mixing with tabletting ingredients, compressing into tablets, and all necessary steps for preparing the glycerol stabilized diastase compositions of my invention are preferably performed under conditions which do not tend to detrimentally affect enzyme activity and especially diastatic activity. Temperatures are preferably maintained between 0° C. and 45° C.

I have found that glycerol-treated diastatic preparations are especially valuable when it is necessary to submit diastase to rough mechanical and physical processing, such as grinding, chopping, crushing, or pulverizing. Such treatment may be necessary, for instance, when diastase does not have desirable physical characteristics. A lumpy, granulated diastatic preparation may require grinding in a convenient disintegrating device, such as in a ball-mill, a hammer-mill, or a Raymond mill. In such cases, glycerol treating the diastase before grinding stabilizes diastase activity to a remarkable degree. Generally, glycerol treatment is applied on the diastase after drying it and before grinding it. Glycerol is applied in order to thoroughly contact diastase, care is taken to well permeate aggregations and lumps; the preparation is then processed through a ball or hammer-mill. Fine powders having marked stabilized diastatic activity are obtained.

Another advantage of diastatic preparations which are glycerol-treated in accordance with this invention and having remarkable diastase stability is that they may be stored for long periods of time. They may be shipped in drums or other containers, or they may be packaged for commercial distribution. Notwithstanding extensive handling and processing glycerol-treated diastase preparations retain diastatic activity to a considerably greater extent than diastase preparations untreated with glycerol.

I have found that glycerol-treated diastase preparations are particularly well-suited for production of compressed diastatic tablets. There are several ways whereby glycerol-treated diastase may be prepared for tabletting. One way is to mix nonglycerol treated diastase with materials which are generally employed in the preparation of enzyme tablets. Such materials include fillers, releasing agents, dispersing agents, lubricants, binders, disintegrating agents, and other similar materials which do not tend to detrimentally affect enzymes. The mixture of tabletting ingredients and untreated glycerol diastase is then treated with the specified amount of glycerol. The treated mixture is then tabletted. Another procedure is to treat diastase with the specific amount of glycerol. The diastase is then mixed with the mixture of tabletting ingredients which may be in powdered or in granulated form, and this mixture is compounded into tablets. This latter procedure is preferred. The resulting compressed diastase tablets have remarkable diastatic stability both during forming and during storage. The baking industry is an especially desirable field for the improved tablets.

The following examples further illustrate this invention; they are not to be construed as limiting in scope or in spirit. All parts are by weight.

EXAMPLE 1A

Preparation of diastase

A sixty-gallon kettle of stainless steel was charged with forty gallons of water, thirteen pounds of corn starch, twenty-one pounds of corn steep liquor, and thirty-two pounds of hominy and the mixture rendered about neutral by the adidtion of a little caustic soda solution. Thereupon, three-quarters of a pound of a commercial liquefying diastase was added and the mixture was well stirred and heated. The starch was thus partially solubilized. The temperature was carried to over 100° C. to inactivate the liquefying enzyme used and render the mixture free of microorganisms. There were then added about three pounds of a sterile 1% solution of cetyl alcohol in castor oil to control foaming. The mixture was cooled to 35° C. and inoculated with a suspension of the spores of a strain of *Aspergillus oryzae*. Air was filtered and passed into the mixture at the rate of forty-five cubic feet (N.T.P.) per hour, and the kettle was maintained at twenty-five pounds pressure. By the use of cooling water in the jacket of the kettle, the temperature of the inoculated mixture was held between 28 and 32° C. The mixture was well and vigorously stirred. Samples were taken from time to time. The culture medium was then filtered. About 4 parts of alcohol were added for each part of clear filtrate. A precipitate formed which was then separated by centrifuging and dried at 40° C. The product has a high diastatic activity.

EXAMPLE 1B

There are taken 100 parts of a fungal diastase powder having an activity of 10,000 SKB units per gram and they are placed in a revolving cylinder. Glycerol is evenly and slowly sprayed onto the powder to insure intimate mixing and absorption of glycerol. Glycerol addition is stopped when it is observed that the powder is losing its free-flowing characteristics and that it tends to become somewhat lumpy. Total amount of glycerol added is about 20 parts. Enough untreated diastase is mixed into the treated diastase until free-flowability is restored. Total amount of untreated diastase added is 20 parts.

The following ingredients are mixed in a stainless steel container:

| | Parts |
|---|---|
| Corn starch (U.S.P.) | 30 |
| Brewers grits | 30 |
| Tartaric acid | 13 |
| Sodium bicarbonate | 12 |

This dry mixture is fed into the hopper of a rotary tabletting machine and compressed. The resulting tablets are broken in a granulated form. Eighty parts of the granulated tabletting ingredients are fed into a rotary drum and mixed with 20 parts of the glycerol-treated diastase prepared above with thorough mixing. Different portions of the composition are compressed into tablets at different pressures. Diastase untreated with glycerol is also tabletted under the same conditions. Tablets from each portion are assayed for diastase activity. The results are presented in Table I.

TABLE I.—EFFECT OF GLYCEROL TREATMENT ON DIASTASE UPON TABLETTING

| Tabletting pressures in p.s.i. | Percentage Loss in Activity | |
|---|---|---|
| | No glycerol treatment | Glycerol treatment |
| 5,000 | 11.0 | 3.0 |
| 10,000 | 21.5 | 5.0 |
| 20,000 | 40.0 | 16.0 |

The stabilized tablets may be used as ingredient in bread making to improve gassing power, loaf volume, crust color, grain, and texture.

A portion of 200 parts of a diastase preparation adjusted in activity to 5,000 SKB units per gram and treated with 10 parts of glycerol is placed in a revolving drum and agitated for 24 hours at 25° C. A diastase sample not treated with glycerol is also agitated in a similar revolving drum under the same conditions. Samples are assayed for diastase activity at 0 and 24 hours. At the end of that time glycerol treated samples show a diastatic activity equal or superior to untreated samples.

EXAMPLE 2

A crude diastase preparation prepared from *Aspergillus niger* is spread and dried on a tray at a temperature range from about 25 to 45° C. A somewhat lumpy, aggregated diastase preparation is obtained. The preparation is found to have 10,000 SKB activity units. One hundred parts of this preparation are carefully and thoroughly humected by contacting and mixing in a stainless steel beaker with 10 parts of U.S.P. glycerol. The glycerol treated preparation is then passed through a Raymond mill which disintegrates the lumpy mixture until a fine powder is obtained. One hundred parts of the lumpy diastase preparation not treated with glycerol are then passed through the mill and disintegrated into a fine powder. Both powders, the glycerol treated and not treated, are assayed for diastatic activity. The glycerol treated diastatic preparation retains about 40% more diastatic activity than the glycerol untreated preparation. Greater losses may be shown with preparations processed in the mill for longer periods of time.

EXAMPLE 3

Ten parts of a commercial fungal diastase preparation having been adjusted to an SKB activity of 5,000 units per gram with corn starch are intimately mixed with granulated tablet filler. The granulated composition was made up with 65 parts of soluble starch, 13 parts of tartaric acid, and 13 parts of sodium bicarbonate. The mixture of diastase and granulated tablet filler is evenly humected with 0.5 part of 95% glycerol. The powder is free-flowing. It is fed into the hopper of a tabletting machine and compressed into tablets at 1,000, 5,000, 10,000 and 20,000 p.s.i. The resulting tablets are assayed. Diastatic activity is found to have been highly stabilized and while there is a light falling off of diastatic activity with increasing pressure this loss is but a fraction of the loss found with compositions not treated with glycerol and then tabletted.

The procedure of Example 2 is followed again with 0.01 part of U.S.P. glycerol. A tabletted sample has retained the greatest part of its original diastatic activity. Untreated samples show ⅕ to ¼ loss of diastatic activity.

One hundred parts of crude diastase having an SKB activity of 500 units per gram and one hundred parts of purer diastase having an SKB activity of 50,000 units per gram are treated with 0.5 and 8 parts of technical grade glycerol by well mixing. The mixture is stored in small drums at 30° C. for several weeks, at the end of which the samples are assayed for diastatic activity. Essentially there is found no loss of activity in either composition.

EXAMPLE 4

A commercial fungal diastase preparation prepared from *Aspergillus oryzae* is found to have diastase and high protease activity. Assays show a diastase activity of 2,000 SKB units per gram and protease activity of 25,000 H.U. units per gram. The filler material is salt, wheat flour, and corn starch. One hundred parts of the preparation are placed in a stainless steel container equipped with a mechanical stirrer and 5.2 parts of 99% glycerol are intimately mixed into the enzyme powder; active agitation is maintained for an hour. The powder remains free-flowing. The stabilized composition is assayed for diastatic activity. It is then stored four weeks at 10° C., then processed, adjusted to 500 SKB units of activity per gram by uniform addition of starch, and then packaged in one-pound drums. After four weeks, samples are assayed for diastase activity. Diastatic activity has remained unaltered.

Fifty parts of this stabilized diastase preparation are mixed with more glycerol in such an amount that the powder starts to stick to the sides of the container; it is not free-flowing any more. The amount of glycerol added is 3.5 parts. Addition of 1.5 part of untreated diastase restores flowability to the powder. Twenty parts of this stabilized diastase are well mixed with a granulated tabletting mixture containing:

- 60 parts corn starch
- 11.5 parts sodium bicarbonate
- 1. parts stearic acid
- 12.5 parts tartaric acid The mixture is fed into a hopper of rotary tabletting machine. Compressed tablets are produced at pressures varying from 1,000 to 25,000 p.s.i. Diastase untreated with glycerol is compressed under the same conditions. Diastase activity of resulting compressed products is compared in Table II.

TABLE II.—EFFECT OF TABLETTING ON TREATED AND UNTREATED DIASTASE PREPARATIONS

| Tabletting pressures, p.s.i. | Percent Loss of SKB Unit Activity | |
|---|---|---|
| | No glycerol treatment | Glycerol treatment |
| 5,000 | 13.0 | 5 |
| 10,000 | 31.0 | 10 |
| 20,000 | 41.0 | 15 |

The improved tablets are useful in various applications whenever active hydrolysis of starch is required.

EXAMPLE 5

In a revolving drum there are placed 100 parts of a diastase preparation derived from *Aspergillus oryzae* and adjusted with corn starch to a diastatic activity of 5,000 SKB units per gram. This powder is intimately mixed by agitation and stirring with 5 parts of technical grade of glycerol (70%). The same tabletting ingredients as in Example 1 are prepared and granulated in the same manner. There are taken 0.5, 1, 5, 10, 15, 20, and 30 parts, which are then individually mixed with the tabletting ingredients, and compressed at 10,000 p.s.i. Untreated diastase is mixed in the same proportions and tabletted at 10,000 p.s.i. The tablets are assayed for diastatic activity. Glycerol untreated compositions show losses of activity as high as 40%, glycerol treated compositions have retained more than 90% of their original diastatic activity. Essentially the same degree of stabilization is obtained with 100 parts of diastase compositions which have been treated with 10 parts of technical glycerol and are shaken for 48 hours at 30° C.

I claim:

1. A dry free-flowing diastatic composition which comprises a mixture of dry particles of fungal diastase and glycerol, said diastase having an activity of at least 5,000 SKB units per gram, said glycerol being intimately admixed with said diastase in an amount ranging from about 0.01 to 30 percent of the weight of the diastase, and the diastase of said diastatic composition having improved stability with respect to mechanical processing.

2. A dry free-flowing diastatic composition which comprises a mixture of dry particles of fungal diastase and glycerol, said diastase having an activity of at least 10,000 SKB units per gram, said glycerol being intimately admixed with said diastase in an amount ranging from about 0.1 to 20 percent of the weight of the diastase, and the diastase of said diastatic composition having improved stability when subjected to pressures in excess of 1000 p.s.i.

3. A dry free-flowing diastatic tabletting composition which comprises dry particles of fungal diastase, glycerol and tabletting ingredients, said diastase having an activity of at least 10,000 SKB units per gram, said glycerol being intimately admixed with said diastase and with said tabletting ingredients and said glycerol being used in an amount ranging from 0.1 to 20 percent by weight of the diastase, and the diastase of said composition exhibiting improved retention of acivity under tabletting pressures in excess of 1000 p.s.i.

4. A dry free-flowing diastatic tabletting composition having at least an activity of 10,000 SKB units which comprises dry particles of fungal diastase, glycerol and tabletting ingredients, said glycerol being intimately admixed with said diastase and with said tabletting ingredients and said glycerol being used in an amount ranging from 0.1 to 20 percent by weight of the diastase, and the diastase of said composition exhibiting improved retention of activity under tabletting pressures in excess of 1000 p.s.i.

5. A dry free-flowing diastatic tabletting composition having at least an activity of 10,000 SKB units which comprises dry particles of fungal diastase, glycerol and tabletting ingredients, said glycerol being intimately admixed with said diastase and with said tabletting ingredients and said glycerol being used in an amount ranging from 0.1 to 20 percent by weight of diatase, and the diastase of said composition decreasing in SKB activity by not more than 5% per pressure increment of 5000 p.s.i.

References Cited in the file of this patent

UNITED STATES PATENTS

| | | |
|---|---|---|
| 1,325,327 | Kohman et al. | Dec. 16, 1919 |
| 1,599,930 | Takamine et al. | Sept. 14, 1926 |
| 1,731,400 | Takamine | Oct. 15, 1929 |
| 1,919,676 | Wallerstein | July 25, 1933 |

OTHER REFERENCES

Waksman et al: "Enzymes," The Williams and Wilkins Company, Baltimore (1926), page 126.

"Enzymes and Their Role in Wheat Technology," 1946, by J. A. Anderson, published by Interscience Publ. Inc. (New York), page 116.

"Advances in Enzymology," by Nord, Interscience Publishers Inc., New York, 1953, vol. XIV, page 397.

Remington: "Practice of Pharmacy," 1956, The Mack Publishing Co., Easton, Pa., pages 374–381 and 387.